Nov. 27, 1923.
G. L. MOORE
1,475,591
AUTOMATIC LUBRICATOR
Filed July 1, 1921
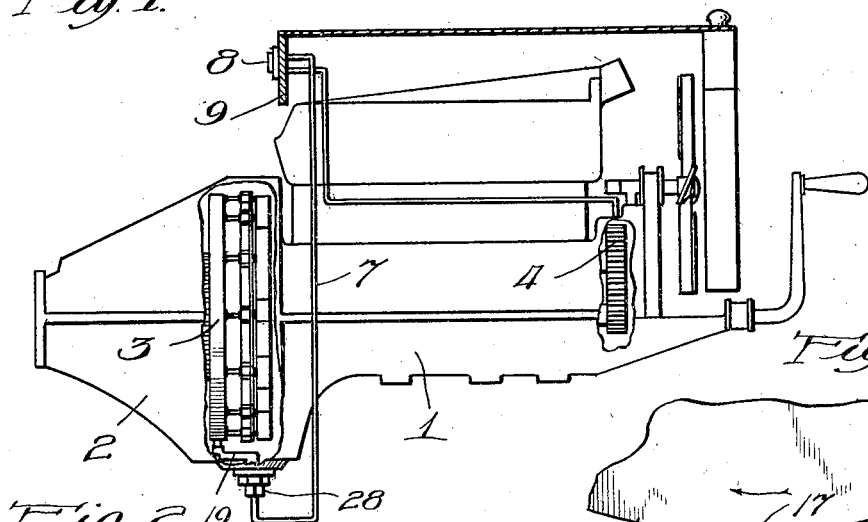
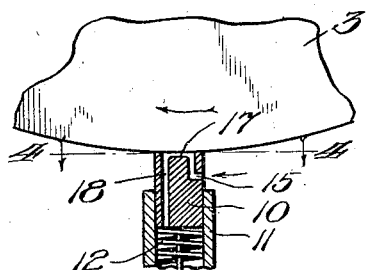
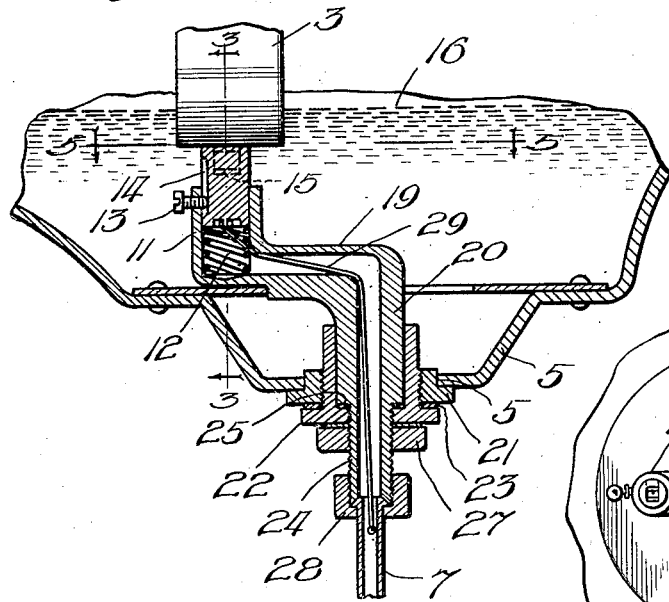
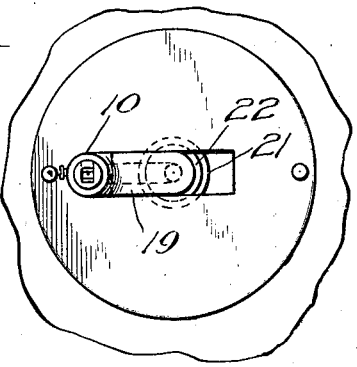
Inventor
George L. Moore
by Chamberlin & Trendenreich
Attys Patented Nov. 27, 1923.

1,475,591

UNITED STATES PATENT OFFICE.

GEORGE L. MOORE, OF CHICAGO, ILLINOIS, ASSIGNOR TO HELEN CADWELL, OF SAUGERTIES, NEW YORK.

AUTOMATIC LUBRICATOR.

Application filed July 1, 1921. Serial No. 481,750.

*To all whom it may concern:*

Be it known that I, GEORGE L. MOORE, a citizen of the United States, residing at Chicago, county of Cook, and State of Illinois, have invented a certain new and useful Improvement in Automatic Lubricators, and declare the following to be a full, clear, and exact description of the same, such as will enable others skilled in the art to which it pertains to make and use the same, reference being had to the accompanying drawings, which form a part of this specification.

My invention has for its object to produce a simple and novel mechanism for causing a rotating part of a machine to act as a pump element for pumping oil from an oil container in which said part revolves to a remote point. My invention is of general application but is peculiarly adapted for use on automobile engines for the purpose of pumping lubricant from the crank case to the opposite end of the engine, at the same time keeping the driver informed as to whether or not there is oil in the crank case.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a view partly in elevation and partly in section of an automobile engine, conventionally shown, a portion of the automobile hood being shown in section;

Fig. 2 is a section on an enlarged scale taken along a vertical longitudinal plane passing through the pumping device in the bottom of the crank case;

Fig. 3 is a section taken approximately on line 3—3 of Fig. 2, the crank case being omitted; this section being also on line 3—3 of Fig. 4;

Fig. 4 is a top plan view of that portion of the pump in contact with the fly-wheel of the engine or it may be termed a section taken on line 4—4 of Fig. 3; and Fig. 5 is a top plan view of the pump, the fly-wheel being omitted, or, in other words, a section on line 5—5 of Fig. 2.

Referring to the drawing, 1 represents the crank case of an automobile engine at one end of which is an enlargement, 2, forming a well; in which enlargement there is rotatably mounted the fly-wheel of the engine; the fly-wheel extending down into the well. At the front of the engine are gears, 4, or other moving parts over which it is desirable to have oil flow; the oil thence passing down into the crank case and finally being returned to the well.

At the bottom of the well is a central depression, 5, forming a sump or chamber for collecting dregs; the member 5 being provided with a central drain port or outlet, 6.

In accordance with my invention I place within the well underneath the fly-wheel a device into which oil flows from the well, which oil is forced onwardly by the movement of the fly-wheel and discharged through a suitable oil delivery pipe, 7, which leads to a point above the gears, 4, and which may have at an intermediate point a transparent portion, 8, mounted on the dash, 9, of the automobile, so as to permit the driver to note whether or not oil is being pumped while the engine is running. If no oil is being pumped, the supply in the crank case is too low and it should be replenished.

The pump member in contact with the fly-wheel may be a simple cylindrical block, 10, slidably mounted in the upper end of a stationary sleeve, 11, and held up against the fly-wheel by means of a spring, 12, arranged within the sleeve and pressing upwardly against the block. The block may be prevented from turning by means of a set screw, 13, passing through the sleeve into a groove, 14, extending lengthwise of the block; the groove preferably terminating short of the ends of the block so as to prevent the block from being removed while the screw is in its normal position. The block is provided with a passage having one end, 15, opening out through the side of the block at a considerable distance below the oil level, indicated at 16. The passage continues upwardly to the top of the block where it extends diametrically across the block in the form of a groove or channel, 17, for which the fly-wheel forms a cover. The channel, 17, extends circumferentially of the fly-wheel and communicates with the upper end of a passage, 18, extending throughout the length of the block and communicating at its lower end with the interior of the sleeve, 11, below the block. The block is so placed that any given point on the fly-wheel traveling across the top of the block moves from the inlet side of the block toward the passage 18. The sleeve 11 is connected to the oil delivery pipe, 7, in any suitable way. When the crank case contains a normal amount of oil and the engine is running, oil will flow into the inlet end, 15, of the oil passage in the block and will rise until it engages with the fly-wheel. When it reaches the fly-wheel it adheres to the periphery thereof and tends to travel with the same; thus being carried by the fly-wheel along the channel, 17. The block fits closely against the fly-wheel so that when the oil reaches the far end of the channel 17, it hits a solid portion of the block which constitutes the end wall for the channel and therefore the only path for the oil to follow is that downwardly through the passage 18 and thence through the sleeve and out through the oil delivery pipe, 7, to the front end of the engine. Consequently the oil is forced positively, and with considerable pressure, through the oiling system. The oil passage in the block may have any desired cross section, but I have found that good results are obtained by employing a flat rectangular section as best shown in Fig. 4.

It is desirable that devices of this kind be so constructed that they may be easily applied to existing construction, without the boring of additional holes or making other alterations that require the attention of a skilled mechanic. I have therefore provided means whereby the pump element of the oiling system may be inserted through and held in the usual drain outlet from the sump in the bottom of the crank case. To this end, the sleeve, 11, forms one end of a Z-shaped conduit, 19, so shaped that when it is inserted through the drain outlet, 6, with one end or leg, 20, arranged in a vertical position, the sleeve, 11, will lie directly below the fly-wheel with its axis vertical. The part 20 may be fastened in place in any suitable way. In the arrangement shown, there is first screwed into the hole 6 a plug, 21, and into this plug is screwed a gland, 22, between the flange of which and the outer face of the plug 6 is placed a suitable packing, 23. The extreme outer end of the part 20 is reduced in diameter and screw threaded as indicated at 24, thus providing a downwardly-facing shoulder, 25, which rests upon a suitable packing element, 26, within the gland. A nut, 27, is placed on the screw threaded nipple 24 below the gland. The pipe 7 is attached to the lower end of the nipple 24 by any suitable coupling such as indicated at 28.

The spring below the pump block is under an initial pressure so that, if free to do so, it will push the block up beyond the lowest point on the fly-wheel. Therefore, in order that the block will not project up too far when the device is inserted through the drain hole, and thus make it difficult to position it properly relatively to the fly-wheel, I attach to the lower end of the block, a wire or cable, 29, which passes down through the Z-shaped member, 19, and has its lower end projecting somewhat beyond the lower end of the nipple. When the device is placed in position, the wire or cable, 29, is pulled down so as to draw the pump block back into the sleeve and prevent it from catching on the edge of the fly-wheel during the assembling operation.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In combination, an oil container, a rotatable wheel, a member held against said wheel and having an open channel closed at the ends in the face engaged with said wheel, said member having an oil inlet passage leading from the exterior thereof at a point below the oil level in said container to one end of said channel and having a discharge passage for oil communicating with the other end of said channel.

2. In combination, an oil container, a wheel rotatable in the container, a member having one end held against said wheel, said member having a channel in said end open on the side toward said wheel, there being a passage leading from the exterior of said member at a point below the oil level in the container to one end of said channel, and a discharge conduit for oil including a passage leading from the other end of said channel.

3. In combination, an oil container, a wheel rotatable in said container, a member held against said wheel and having a channel in the face in contact with the wheel, said member having an oil inlet connecting one end of said channel with the interior of the container at a point below the oil level therein, and a discharge conduit for oil including a passage leading from the other end of said channel.

4. A pump comprising a rotatable wheel, a member having a face held againt said wheel, said face having therein a channel closed at the ends and open on the side toward the wheel, there being an inlet passage for fluids leading out through said member from one end of said channel, and there being a discharge passage for oil extending from the other end of said channel.

5. A pump element comprising a block having in one face a channel closed at the ends, a passage leading from one end of said channel out through the side of the block at a point remote from the channel, and a discharge passage extending through the block from the other end of the channel.

6. In combination, an engine crank case, a fly-wheel rotatable in one end of said case, and means co-operating with the fly-wheel for pumping oil from the bottom of the crank case in the vicinity of the wheel to a point at the other end of the crank case.

7. In combination, an engine crank case having an oil well, a fly-wheel rotatable in said well, and means located below the oil level in said well and co-operating with said wheel to pump oil from the well to a remote point.

8. In combination, a crank case having a drain outlet, a fly-wheel arranged in said case in the vicinity of said outlet, and an oil pump operatively related to said wheel and forming a closure for said outlet.

9. In combination, an engine crank case, a fly-wheel rotatable in one end of said case, a conduit extending from the aforesaid end of the case to the opposite end, and pumping means lying underneath the fly-wheel and co-operating with the latter to pump oil out of the bottom of the crank case, and a connection between the discharge side of said pump and said conduit.

10. In combination, a crank case having a drain outlet, a fly-wheel arranged in said case in the vicinity of said outlet, a closure for said outlet, and an oil pump in said crank case and operatively related to said wheel and supported by said closure.

11. In combination, a crank case having a drain outlet, a fly-wheel arranged in said case in the vicinity of said outlet, an oil pump of a size and shape to permit the same to pass through said outlet and be placed in operative relation to said wheel, and a part associated with said pump adapted to form a closure for said outlet and at the same time hold the pump in place.

12. In combination, a crank case having a drain outlet, a fly-wheel arranged in said case in the vicinity of said outlet, a conduit shaped to permit it to be inserted through said outlet and of such a length that when one end lies in the vicinity of the fly-wheel the other end projects out through said outlet, means on the fly-wheel end of said conduit co-operating with said fly-wheel to cause oil to be pumped through said conduit on the rotation of the fly-wheel, and means co-acting with said conduit at said outlet to close said outlet and at the same time support the conduit in its working position.

In testimony whereof, I sign this specification.

GEORGE L. MOORE.